United States Patent
Lucas

(10) Patent No.: US 12,012,217 B2
(45) Date of Patent: *Jun. 18, 2024

(54) AUXILIARY POWER UNIT AIR INLET DOOR WITH SPECIFIED ACOUSTIC REFLECTING AND/OR DIFFUSING CHARACTERISTICS

(71) Applicant: Gulfstream Aerospace Corporation, Savannah, GA (US)

(72) Inventor: Michael Lucas, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 102 days.

This patent is subject to a terminal disclaimer.

(21) Appl. No.: 17/821,336

(22) Filed: Aug. 22, 2022

(65) Prior Publication Data
US 2024/0059424 A1     Feb. 22, 2024

(51) Int. Cl.
*B64D 41/00* (2006.01)
*B64D 33/02* (2006.01)

(52) U.S. Cl.
CPC ............ *B64D 41/00* (2013.01); *B64D 33/02* (2013.01); *B64D 2033/0206* (2013.01); *B64D 2033/0213* (2013.01); *B64D 2041/002* (2013.01)

(58) Field of Classification Search
CPC ............................. B64D 41/00; B64D 33/02; B64D 2033/0206; B64D 2033/0213; B64D 2041/002; F02C 7/045; F05D 2220/50; Y02T 50/60
See application file for complete search history.

(56) References Cited

U.S. PATENT DOCUMENTS

| | | | | |
|---|---|---|---|---|
| 3,821,999 A * | 7/1974 | Guess | ................. | G10K 11/172 428/116 |
| 4,049,074 A * | 9/1977 | Kazin | ................... | B64D 33/02 181/284 |
| 4,632,019 A * | 12/1986 | Whiteman | .............. | B64F 1/364 454/119 |
| 6,124,646 A * | 9/2000 | Artinian | ................. | B64D 13/06 60/39.01 |
| 6,272,838 B1 * | 8/2001 | Harvell | ...................... | F02C 7/32 244/58 |
| 6,349,899 B1 * | 2/2002 | Ralston | .................. | B64D 33/02 244/53 B |

(Continued)

*Primary Examiner* — Medhat Badawi
(74) *Attorney, Agent, or Firm* — Lorenz & Kopf, LLP

(57) ABSTRACT

An aircraft includes a fuselage, a main entry door with an associated passenger loading zone, an auxiliary power unit (APU) in the fuselage, and an APU inlet assembly. The APU inlet assembly has an inlet duct, and inlet door, and means for redirecting sound waves coupled to or integrated with an interior side of the inlet door. The inlet duct has a first end coupled to the APU, and a second end associated with the inlet door. The inlet door moves between a closed position and an open position. The means for redirecting sound waves is positioned at a particular location on the interior side of the inlet door, and includes certain acoustic features and characteristics. The particular location and the acoustic features and characteristics cooperate to redirect sound waves generated by the APU away from the passenger loading zone when the inlet door is in the open position.

17 Claims, 10 Drawing Sheets

(56) References Cited

U.S. PATENT DOCUMENTS

| | | | | |
|---|---|---|---|---|
| 7,124,856 B2 * | 10/2006 | Kempton | | B64D 33/02 |
| | | | | 60/725 |
| 7,540,142 B2 * | 6/2009 | Sheoran | | F02C 7/042 |
| | | | | 60/39.83 |
| 8,079,550 B2 * | 12/2011 | Brill | | B64D 41/00 |
| | | | | 244/129.4 |
| 9,678,488 B1 * | 6/2017 | Dhondt | | B64F 5/60 |
| 9,840,334 B2 * | 12/2017 | Lucas | | F02C 7/045 |
| 10,392,130 B2 * | 8/2019 | Tan | | G01S 17/89 |
| 11,008,112 B2 * | 5/2021 | Solstin | | F02C 7/04 |
| 11,591,074 B1 * | 2/2023 | Lu | | B64C 13/507 |
| 2002/0050420 A1 * | 5/2002 | Porte | | F02K 1/827 |
| | | | | 181/292 |
| 2004/0195444 A1 * | 10/2004 | Palin | | B64D 13/08 |
| | | | | 244/118.5 |
| 2005/0017127 A1 * | 1/2005 | Minh | | F03H 99/00 |
| | | | | 244/62 |
| 2005/0224635 A1 * | 10/2005 | Hein | | F02C 7/04 |
| | | | | 244/10 |
| 2005/0253020 A1 * | 11/2005 | McCoskey | | B64F 1/305 |
| | | | | 244/137.1 |
| 2005/0253021 A1 * | 11/2005 | McCoskey | | B64C 25/405 |
| | | | | 244/137.1 |
| 2006/0026017 A1 * | 2/2006 | Walker | | H04L 63/302 |
| | | | | 701/31.4 |
| 2006/0163425 A1 * | 7/2006 | Brown | | B64D 41/00 |
| | | | | 244/53 B |
| 2006/0163432 A1 * | 7/2006 | McCoskey | | B64F 1/31 |
| | | | | 244/137.1 |
| 2006/0206246 A1 * | 9/2006 | Walker | | H04L 63/302 |
| | | | | 701/16 |
| 2007/0040063 A1 * | 2/2007 | McCoskey | | B64F 1/36 |
| | | | | 244/114 R |
| 2007/0040066 A1 * | 2/2007 | McCoskey | | B64F 1/31 |
| | | | | 244/137.1 |
| 2007/0209383 A1 * | 9/2007 | Hutton | | F28D 20/021 |
| | | | | 62/434 |
| 2009/0152406 A1 * | 6/2009 | Francisco | | F02C 7/32 |
| | | | | 244/53 B |
| 2009/0169913 A1 * | 7/2009 | Mueller | | F02C 7/045 |
| | | | | 219/118 |
| 2010/0068036 A1 * | 3/2010 | Brill | | B64D 41/00 |
| | | | | 415/119 |
| 2010/0187039 A1 * | 7/2010 | Holmgren | | B32B 37/146 |
| | | | | 428/317.1 |
| 2012/0188844 A1 * | 7/2012 | Tiltman | | G10K 11/205 |
| | | | | 367/2 |
| 2012/0292455 A1 * | 11/2012 | DeDe | | B64D 33/02 |
| | | | | 244/53 B |
| 2013/0139522 A1 * | 6/2013 | Haillot | | F02C 9/18 |
| | | | | 60/785 |
| 2013/0151039 A1 * | 6/2013 | Haillot | | F01D 17/165 |
| | | | | 701/3 |
| 2015/0102659 A1 * | 4/2015 | Liffring | | B60R 16/03 |
| | | | | 307/9.1 |
| 2015/0102660 A1 * | 4/2015 | Shander | | B64C 1/18 |
| | | | | 307/9.1 |
| 2015/0102661 A1 * | 4/2015 | Shander | | H02J 13/00017 |
| | | | | 307/9.1 |
| 2015/0102662 A1 * | 4/2015 | Walstrom | | H02J 4/00 |
| | | | | 307/9.1 |
| 2015/0102663 A1 * | 4/2015 | Brouwer | | H02J 4/00 |
| | | | | 307/9.1 |
| 2015/0103447 A1 * | 4/2015 | Brouwer | | H02H 7/00 |
| | | | | 361/1 |
| 2015/0103457 A1 * | 4/2015 | Shander | | H02J 3/381 |
| | | | | 361/88 |
| 2015/0103458 A1 * | 4/2015 | Liffring | | H02J 50/40 |
| | | | | 307/17 |
| 2015/0168039 A1 * | 6/2015 | Kelnhofer | | F25B 49/02 |
| | | | | 62/208 |
| 2015/0353203 A1 * | 12/2015 | Rehman | | B64D 33/02 |
| | | | | 244/129.4 |
| 2016/0096628 A1 * | 4/2016 | Vue | | B64D 13/00 |
| | | | | 237/12.3 A |
| 2016/0244172 A1 * | 8/2016 | Gibbons | | B64D 13/06 |
| 2017/0036775 A1 * | 2/2017 | Jones | | F01P 3/20 |
| 2017/0274847 A1 * | 9/2017 | Shander | | H02J 4/00 |
| 2018/0002029 A1 * | 1/2018 | Zhang | | B64D 33/02 |
| 2018/0134382 A1 * | 5/2018 | Scholl | | B64D 27/20 |
| 2020/0189719 A1 * | 6/2020 | Jasklowski | | B64C 25/42 |
| 2020/0189725 A1 * | 6/2020 | Jasklowski | | F02K 1/70 |
| 2020/0189728 A1 * | 6/2020 | Mackin | | B64C 25/42 |
| 2021/0047045 A1 * | 2/2021 | Brown | | B64D 13/08 |
| 2021/0061484 A1 * | 3/2021 | Lawyer | | B64C 1/18 |
| 2021/0122478 A1 * | 4/2021 | Mackin | | B64D 13/06 |
| 2021/0284344 A1 * | 9/2021 | Martinez Sancho | | B64D 13/06 |

\* cited by examiner

AUXILIARY POWER UNIT AIR INLET DOOR WITH SPECIFIED ACOUSTIC REFLECTING AND/OR DIFFUSING CHARACTERISTICS

TECHNICAL FIELD

Embodiments of the subject matter described herein relate generally to aircraft. More particularly, embodiments of the subject matter relate to an auxiliary power unit inlet duct assembly equipped with an inlet door that is specifically configured to mitigate noise generated by an auxiliary power unit.

BACKGROUND

Jet aircraft commonly include an auxiliary power unit (APU). An APU provides electric power to the aircraft primarily during times when the jet engines are powered down. For example, when passengers are boarding the aircraft or deplaning, it is common to operate the APU to power the aircraft's systems.

An APU utilizes a jet engine that is connected to an electric generator rather than to a propulsion system. Like all jet engines, an APU requires a supply of air. Because the APU is mounted inside of the fuselage instead of in a nacelle, it is not exposed to the ambient air around the aircraft and, therefore, it requires a dedicated pathway to supply it with air and a dedicated pathway to vent its exhaust. The pathway that supplies the APU with air commonly includes an inlet duct that connects the APU to an opening in the fuselage. The opening is covered by a door that moves between a closed position and one or more open positions. While the door is in the closed position, air is precluded from entering the inlet duct. The door is kept closed while the APU is powered down. When the door is in an open position, air is able to enter the inlet duct and reach the APU. The door to the inlet duct is commonly mounted on a top portion of the fuselage. In some instances, the door is positioned near the vertical stabilizer.

An APU generates a substantial amount of noise while operating. The primary inlet noise produced by the APU has a frequency that corresponds with the number of blades used in its compressor multiplied by the rotational speed. The higher the frequency of the noise, the more directional the noise will be. The high frequency noise propagates up the inlet duct in a direction opposite to the direction of the airflow and continues out of the inlet into the ambient airspace. Additionally, the high frequency noise will be redirected by solid surfaces that it encounters as it travels outwardly through the inlet duct. When this high frequency, highly directional noise encounters the door to the inlet duct, it will be emitted toward a "noisy zone" outside the aircraft. Any person located in the path of this noise emitted from the inlet duct door will hear a persistent, shrill screech.

The door of the inlet duct commonly opens in a direction that faces towards a forward portion of the aircraft. If the main passenger door to the aircraft is located on the same side of the aircraft as the door to the inlet duct, then passengers boarding or deplaning the aircraft while the APU is operating may experience a noisy environment if the noise emanating from the inlet duct is directed towards the passengers. This may be annoying and may make it difficult to carry on a conversation. This is an undesirable condition, especially in the case of a business jet where passengers have an elevated expectation of quiet and no enclosed walkway to shield them from the noise on their approach to the aircraft.

Additionally, the APU can also be operated in flight. The opening of the air inlet door is metered depending on airspeed and/or altitude. Noise from the air inlet can be broadcast to the ground under certain fight conditions and add to the overall noise signature of the airborne aircraft.

To address these situations, aircraft manufacturers commonly line the walls of the inlet duct with sound absorbing material. However, this solution can require an oversized inlet duct to accommodate the volume consumed by the sound absorbing material. Another method to reduce noise from the inlet duct is to add sound absorbing splitter vanes that span the cross-section of the duct. However, these vanes add flow resistance to the inlet system and may require a larger duct cross-section so as not to over restrict the airflow entering the APU. Thus, these solutions may add substantial cost, complexity, and weight to the aircraft.

Accordingly, it is desirable to provide an improved apparatus for reducing the sound generated by operation of an aircraft APU, wherein the generated sound is transmitted by the inlet duct. Furthermore, other desirable features and characteristics will become apparent from the subsequent summary and detailed description and the appended claims, taken in conjunction with the accompanying drawings and the foregoing technical field and background.

BRIEF SUMMARY

An APU inlet assembly of the type disclosed here is suitable for use with an APU on an aircraft having a main entry door, wherein a passenger loading zone is associated with the main entry door. An embodiment of the APU inlet assembly includes an inlet duct, an inlet door, and means for redirecting sound waves. The inlet duct has a first end and a second end, wherein the first end is couplable to the APU. The inlet door is associated with the second end of the inlet duct. The inlet door has an exterior side and an interior side, and the inlet door is configured to move between a first position and a second position. The inlet door closes the second end of the inlet duct when the inlet door is in the first position, and the inlet door permits air to enter the second end of the inlet duct when the inlet door is in the second position. The means for redirecting sound waves is coupled to or integrated with the interior side of the inlet door, and is positioned at a particular location on the interior side of the inlet door. The means for redirecting sound waves has acoustic features and characteristics, wherein the particular location and the acoustic features and characteristics cooperate to redirect sound waves generated by the APU away from the passenger loading zone when the inlet door is in the second position.

Also disclosed is an inlet door for an APU of an aircraft having a main entry door, wherein a passenger loading zone is associated with the main entry door. An embodiment of the inlet door includes: an exterior side; an interior side; and means for redirecting sound waves coupled to or integrated with the interior side. The means for redirecting sound waves is positioned at a particular location on the interior side, has specified acoustic features and characteristics. The particular location and the acoustic features and characteristics cooperate to redirect sound waves generated by the APU away from the passenger loading zone when the inlet door is in an open position.

An aircraft is also disclosed here. An embodiment of the aircraft includes: a fuselage; a main entry door coupled to the fuselage, wherein a passenger loading zone is associated with the main entry door; an APU located inside the fuselage; and an APU inlet assembly. The APU inlet assembly includes: an inlet duct having a first end and a second end, wherein the first end is coupled to the APU; an inlet door associated with the second end of the inlet duct, the inlet door having an exterior side and an interior side, the inlet door configured to move between a closed position and an open position, the inlet door closing the second end of the inlet duct when the inlet door is in the closed position, and the inlet door permitting air to enter the second end of the inlet duct when the inlet door is in the open position; and means for redirecting sound waves coupled to or integrated with the interior side of the inlet door. The means for redirecting sound waves is positioned at a particular location on the interior side of the inlet door, and exhibits certain acoustic features and characteristics. The particular location and the acoustic features and characteristics cooperate to redirect sound waves generated by the APU away from the passenger loading zone when the inlet door is in the open position.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
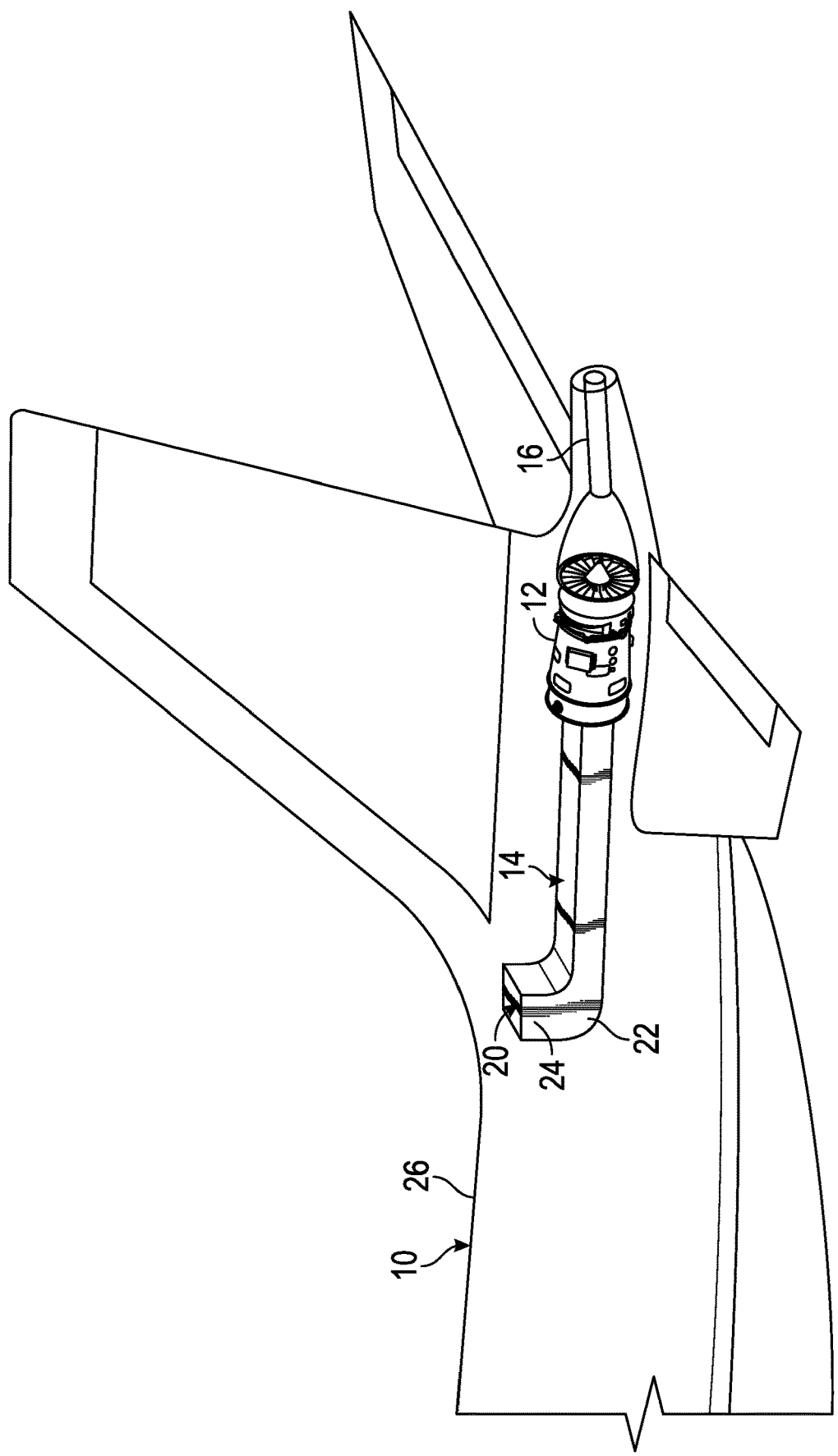
FIG. 1 is a perspective schematic view illustrating a tail section of an aircraft equipped with a non-limiting embodiment of an APU inlet assembly and inlet door.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description may include certain terminology for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

An improved APU inlet assembly is disclosed herein. In a non-limiting embodiment, the APU inlet assembly includes an inlet door that has a particular geometry and/or a specifically designed and configured component coupled thereto, such that sound waves generated by the APU are redirected (reflected and/or diffused) in a predictable and intentional manner. More specifically, sound waves emitted from the inlet assembly are reflected, scattered, or otherwise redirected away from a main entry door of the host aircraft and away from the passenger loading zone that is associated with the main entry door. The redirection of sound waves reduces the noise level that would otherwise be experienced by people entering or exiting the main entry door, people approaching the passenger loading zone, and people standing in or near the passenger loading zone. By mounting (or integrating) a means for redirecting sound waves with an interior side or surface of the inlet door, the direction and orientation of the sound emanating from the inlet duct can be engineered in a desired manner such that the volume of APU noise at or near the passenger loading zone is substantially diminished. Significantly, this diminution in the volume of the APU noise is achieved without making complicated and expensive modifications to the inlet duct itself, such as lining it with sound absorbing material and redesigning the inlet duct to accommodate such sound absorbing material.

Turning to the drawings, FIG. 1 is a perspective schematic view of a rear portion of an aircraft 10 equipped with an APU 12. The APU 12 is fluidly coupled with the ambient environment outside of the aircraft 10 by an inlet assembly 14 and an outlet duct 16. Ambient air enters the APU 12 through the inlet assembly 14 and, after combustion, is exhausted into the ambient environment via the outlet duct 16.

The inlet assembly 14 includes an inlet door 20 and an inlet duct 22. The inlet door 20 is mounted to the aircraft 10 proximate an end 24 of the inlet duct 22, and the inlet door 20 is configured to move between an open position and a closed position. As schematically depicted in FIG. 1, the APU is located inside the fuselage 26 of the aircraft 10. In certain embodiments, the inlet duct 22 and the inlet door 20 are positioned such that the inlet door 20 is integrated into an upper surface of the fuselage 26 of the aircraft 10. This configuration provides the inlet duct 22 with access to ambient air outside of the aircraft 10, which is needed when the APU 12 is operating. When the APU 12 is operating, the inlet door 20 is opened. When in the open position, the inlet door 20 permits ambient air to enter the end of the inlet duct 22. In some embodiments, the inlet door 20 is adjustable, meaning that it may be opened to a range of different angles and/or positions to let more or less air into the inlet duct 22, depending on the air mass flow rate needed to operate the APU 12. When in a closed position, the inlet door 20 closes the end of the inlet duct 22 and inhibits air from entering the inlet duct 22. The inlet door 20 remains closed when the APU 12 is not in operation to keep humidity, precipitation, and other particulate matter out of the inlet duct 22 and to improve the aerodynamics of the aircraft 10 during flight.

Figure 2:
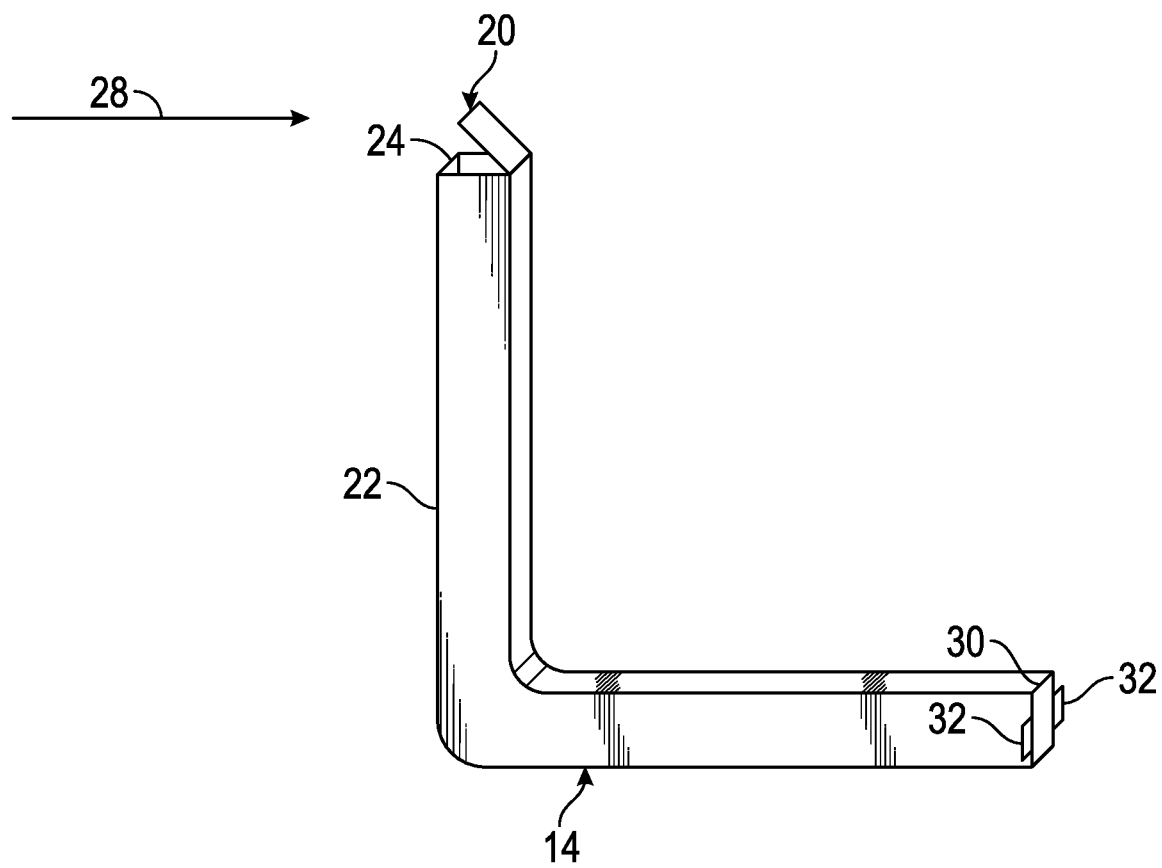
FIG. 2 is an expanded perspective view illustrating the inlet assembly and inlet door of FIG. 1.

FIG. 2 is an expanded perspective view illustrating the inlet assembly 14. In FIG. 2, the inlet door 20 is depicted in its open position. The inlet door 20 may be opened and closed using any mechanism effective to move the inlet door 20 between the open and the closed positions. For example, and without limitation, a hydraulic actuator may be employed for this purpose. The mechanism used to the inlet door 20 between its opened and closed positions has been omitted from the figures for ease of illustration and to simplify the subject matter presented here.

With continuing reference to FIG. 1, when the APU 12 is operated during flight of the aircraft 10, air approaches the inlet door 20 in the direction indicated by the arrow 28. When this air encounters the inlet door 20, a portion of the incoming air will be redirected down into the inlet duct 22 and routed to the APU 12. To facilitate the capture of this air from the free stream, the inlet door 20 may be configured as a scoop. In such a configuration, the inlet door 20 includes suitably shaped, sized, and configured sidewalls to help to capture and guide air from the free stream into the inlet duct 22.

An end 30 of the inlet duct 22 may include or cooperate with two flanges 32. The flanges 32 are used to couple the end 30 to an inlet port (not shown) of the APU 12 (see FIG. 1). While flanges have been illustrated in this embodiment of the inlet assembly 14, those of ordinary skill in the art will appreciate that a wide variety of means may be employed to couple the end 30 to the APU 12, and that the use of any such alternative means would not be a departure from the teachings of the present disclosure.

Figure 3:
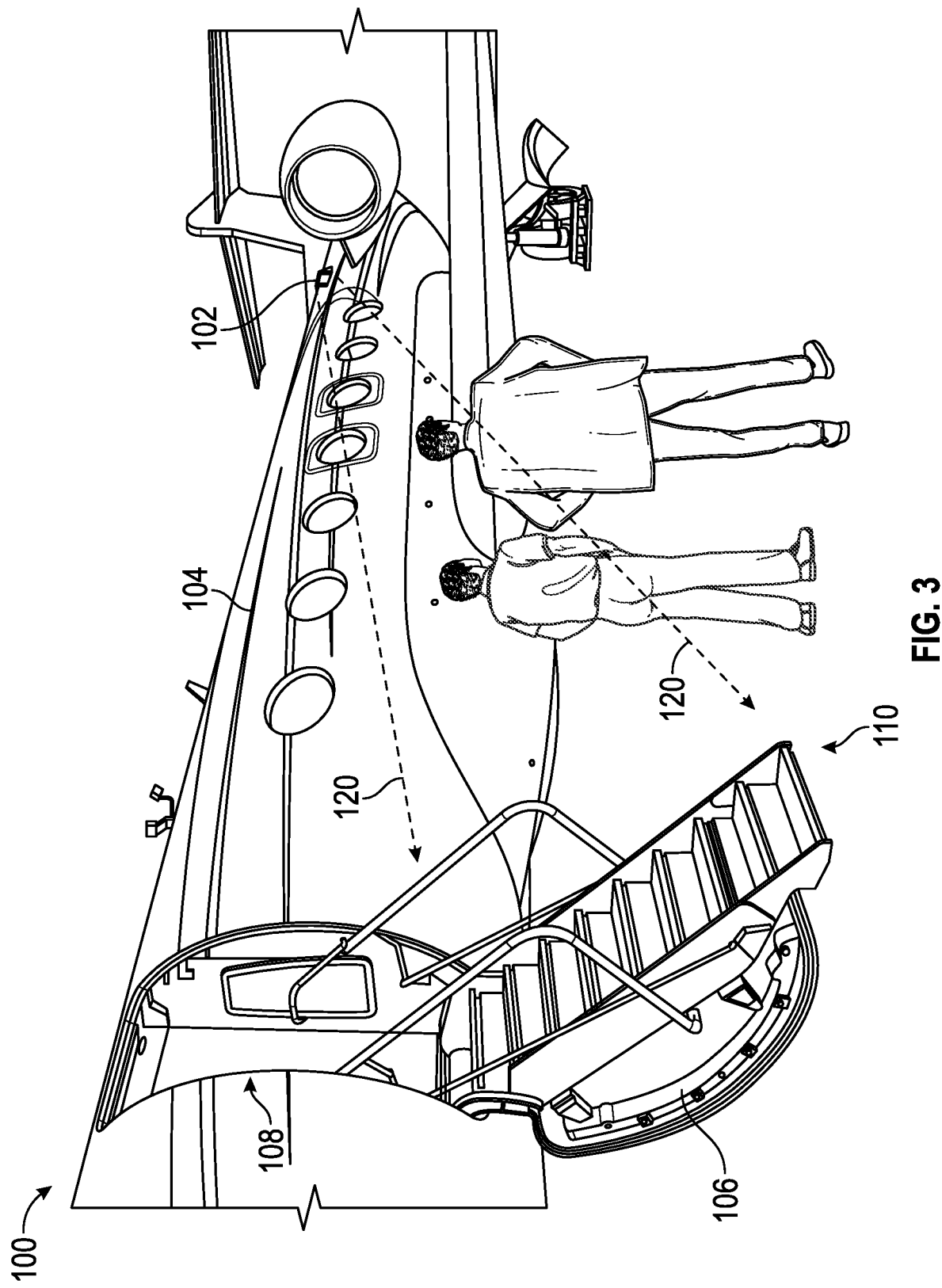
FIG. 3 is a front perspective view of a grounded aircraft with its APU inlet door in an open position.

FIG. 3 is a front perspective view of a grounded aircraft 100 with its APU inlet door 102 in an open position. The aircraft 100 has a fuselage 104 that includes or defines a central longitudinal axis (not shown in FIG. 3, but schematically depicted in FIG. 9 and FIG. 10). A main entry door 106 is coupled to or integrated with the fuselage 104, and a corresponding doorway 108 is formed in the fuselage 104. For the depicted embodiment of the aircraft 100, the main entry door 106 and doorway 108 are located near the front end of the fuselage 104, and the APU inlet door 102 is located near the rear end of the fuselage 104. A passenger loading zone 110 is associated with the main entry door 106. The passenger loading zone 110 may correspond to an area or three-dimensional volume that includes and surrounds the main entry door 106 (when open and deployed as shown in FIG. 3) and the doorway 108. The passenger loading zone 110 may also encompass an amount of nearby space leading to the main entry door 106, e.g., space on the ground that would normally be used during passenger loading and deplaning. In this regard, FIG. 3 shows two people standing in or near the passenger loading zone 110. It should be appreciated that the main entry door 106 of the aircraft 100 may be located in different fuselage position than shown in FIG. 3. Moreover, an embodiment of the aircraft 100 may include one or more additional entry doors located anywhere along the fuselage 104, each with its own corresponding passenger loading zone.

The dashed arrows 120 in FIG. 3 schematically represent a path of sound waves emitted from a conventional or "untreated" APU inlet door 102 during operation of the APU. The arrows 120 generally indicate the manner in which the noise generated by the APU can be directed and oriented toward the passenger loading zone 110. As mentioned previously, operation of the APU causes the inlet door 102 to emit a relatively high level tone (of about 11.4 kHz) toward the passenger loading zone 110, which can be distracting and annoying to people in or near the vicinity of the passenger loading zone 110.

Figure 4:
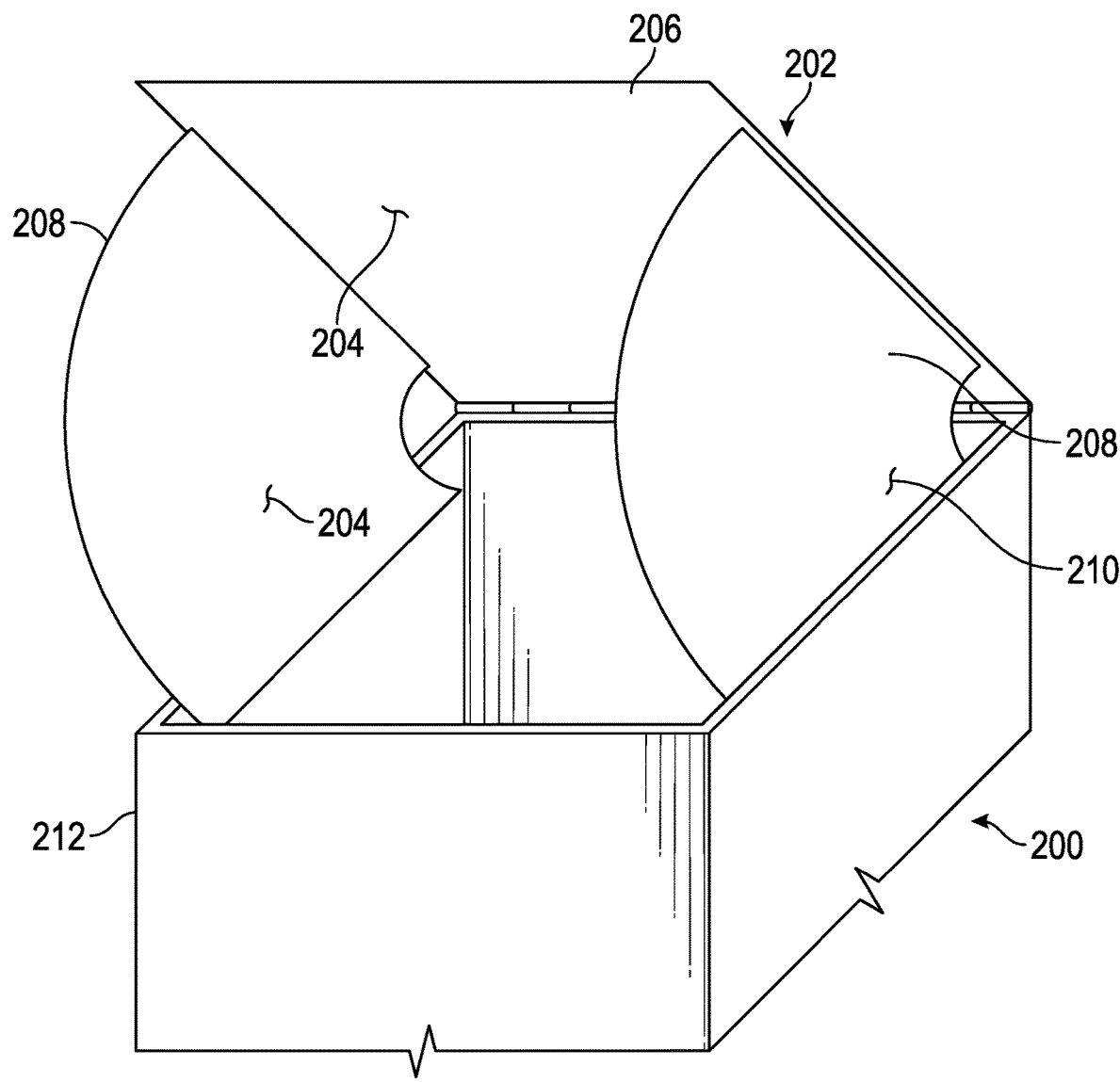
FIG. 4 is a perspective view that schematically depicts a portion of an APU inlet assembly with a conventional or untreated inlet door disposed in an open position.

FIG. 4 is a perspective view that schematically depicts a portion of an APU inlet assembly 200 with a conventional or untreated inlet door 202 disposed in an open position. FIG. 4 is illustrated from the perspective of the arrow 28 in FIG. 2, and the inlet door 202 is depicted in an open position. From the illustrated angle, the interior side 204 of the inlet door 202 is visible (for the illustrated embodiment, the interior side 204 includes the interior surface of a lid 206 and the interior surfaces of two sidewalls 208). The exterior side 210 of the inlet door 202 includes the exterior surface of the lid 206 and the exterior surfaces of the sidewalls 208. The inlet door 202 is movably coupled to the end of an inlet duct 212 and/or is movably coupled to a structural component of the aircraft fuselage (not shown) to facilitate opening and closing of the inlet door 202 as needed. For example, the inlet door 202 can be connected to one or more components of the aircraft using hinges, rotating joints, bearings, or the like.

The interior side 204 of the inlet door 202 is untreated in that the interior surfaces of the lid 206 and the sidewalls 208 are designed and fabricated in an "acoustically agnostic" manner, without any particular consideration, engineering, or controls related to the acoustic properties or characteristics of those surfaces. More specifically, the interior side 204 of the inlet door 202 is designed and fabricated with little to no consideration of its sound reflecting or sound diffusing characteristics. Consequently, sound waves generated by the APU are emitted from the inlet door 202 in an uncontrolled and unmanaged manner, resulting in a noisy passenger loading zone during operation of the APU.

In contrast to the inlet door 202 shown in FIG. 4, an improved APU inlet door of the type described here includes a suitably designed, configured, and arranged means for redirecting sound waves coupled to and/or integrated with the interior side of the inlet door. The means for redirecting sound waves is positioned at one or more particular locations on the interior side of the inlet door to provide the desired sound redirecting effect. The means for redirecting sound waves includes certain acoustic features, properties, and characteristics, wherein the particular location(s) and arrangement of the means for redirecting sound waves, and the associated acoustic features and characteristics, cooperate to redirect sound waves generated by the APU away from the passenger loading zone when the inlet door is open.

Figure 5:
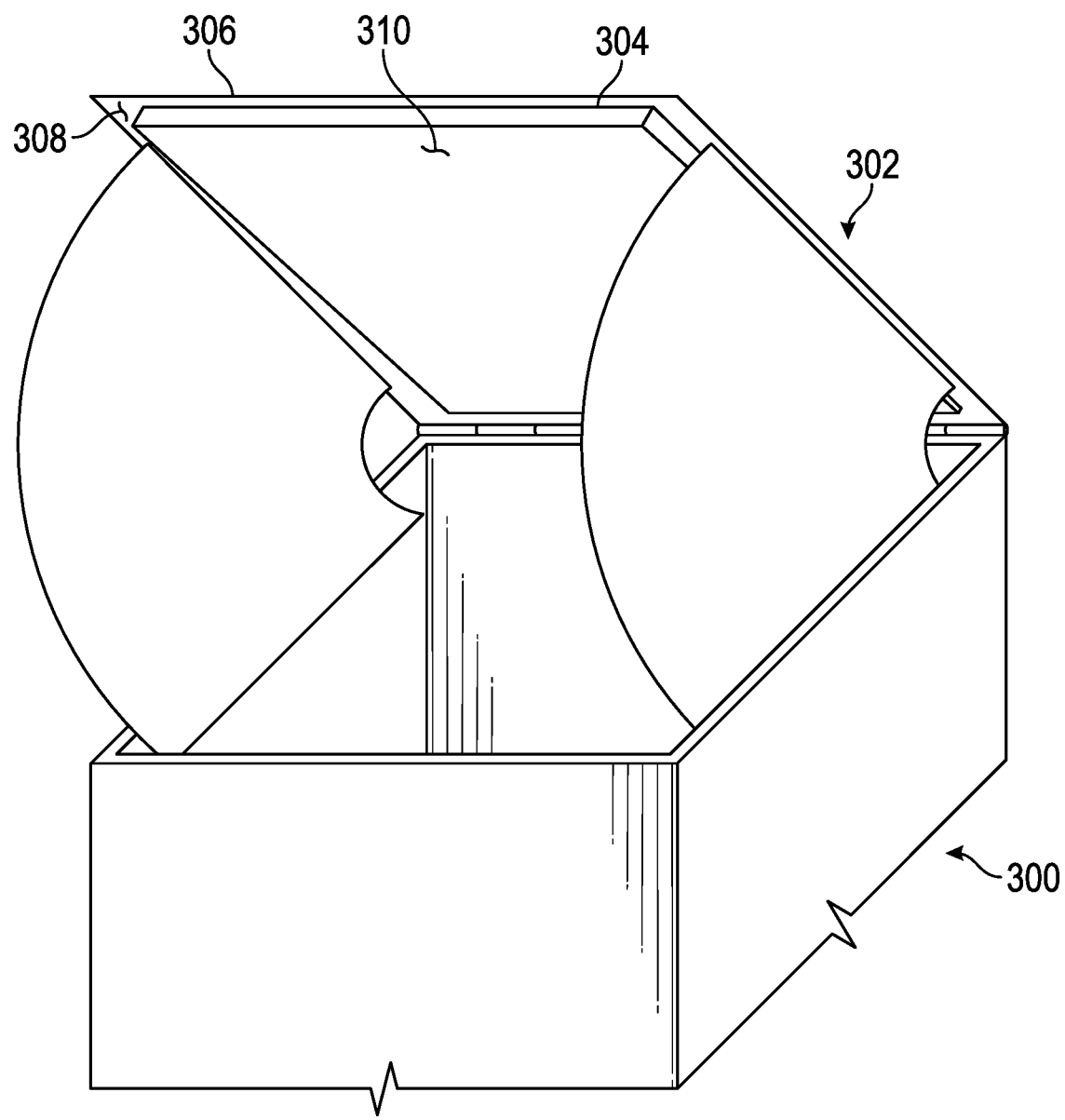
FIG. 5 is a perspective view that schematically depicts a portion of an APU inlet assembly with an embodiment of an inlet door that includes or cooperates with a means for redirecting sound waves implemented as an acoustic reflector.

In accordance with certain embodiments, the means for redirecting sound waves includes or cooperates with at least one acoustic reflector that reflects the sound waves away from the passenger loading zone. In this regard, FIG. 5 is a perspective view that schematically depicts a portion of an APU inlet assembly 300 with an embodiment of an inlet door 302 that includes or cooperates with a means for redirecting sound waves implemented as an acoustic reflector 304. The inlet door 302 has a lid 306 with an interior side 308. In accordance with the illustrated embodiment, the acoustic reflector 304 is mounted to or integrated with the interior side 308 of the lid 306. Although not required for all implementations, the depicted acoustic reflector 304 resembles a wedge having a smooth, flat, and angled outer surface 310 (angled relative to the interior side 308 of the lid 306). The non-limiting embodiment of the acoustic reflector 304 is angled such that the leading edge of the outer surface 310 is offset from the interior side 308 of the lid 306 by a greater amount than the trailing edge of the outer surface 310.

In certain embodiments, the acoustic reflector 304 is fabricated from a tough, rigid, and hard material that efficiently reflects sound waves and is durable enough for the intended aircraft application. For example, the acoustic reflector 304 can include or be fabricated from an aluminum plate, stainless steel, a tough composite material, or the like. As explained in more detail below with reference to FIG. 9 and FIG. 10, the shape, size, dimensions, surface texture (if any), arrangement and position on the interior side 308, and/or geometry (e.g., reflective angle or angles) of the acoustic reflector 304 can be specifically designed, engineered, and configured as needed to achieve the desired noise reduction at or near the passenger loading zone. In this regard, simulation data from acoustic ray tracing techniques and/or measured sound test data can be collected and analyzed to determine an effective, efficient, or optimized design and configuration for the acoustic reflector 304.

FIG. 5 illustrates a simple embodiment that utilizes an acoustic reflector 304, which is located on the interior side 308 of the lid 306. In alternate embodiments, a plurality of physically distinct and separate acoustic reflectors can be positioned in strategic locations on the interior side 308 of the lid 306. Alternatively or additionally, one or more acoustic reflectors can be positioned in strategic locations on the interior side(s) of one or both sidewalls of the inlet door. In this regard, FIG. 6 is a perspective view that schematically depicts a portion of an APU inlet assembly 400 with an embodiment of an inlet door 402 that includes or cooperates with a means for redirecting sound waves implemented as two acoustic reflectors.

Figure 6:
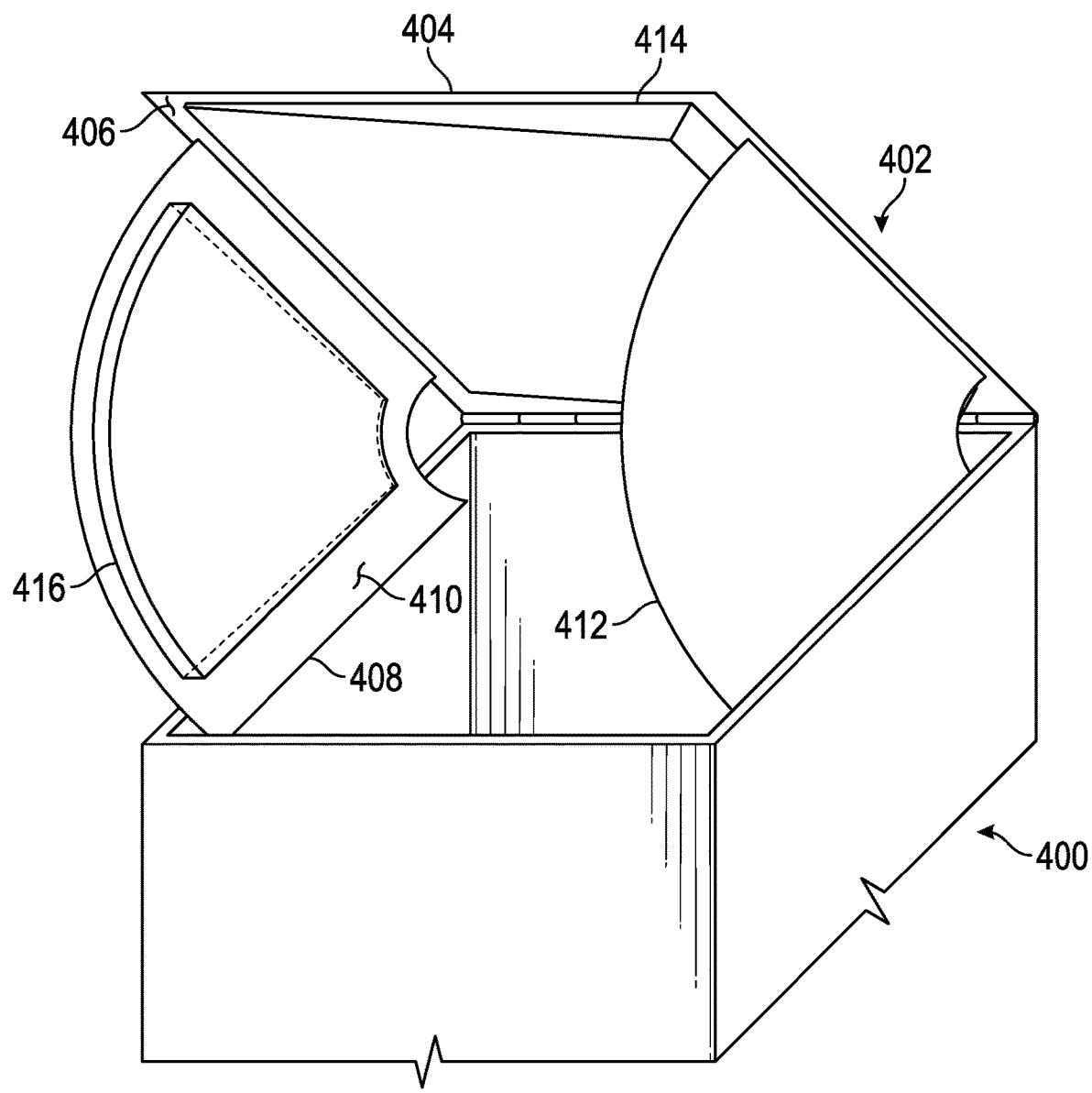
FIG. 6 is a perspective view that schematically depicts a portion of an APU inlet assembly with an embodiment of an inlet door that includes or cooperates with a means for redirecting sound waves implemented as a first acoustic reflector coupled to or integrated with the lid of the inlet door and a second acoustic reflector coupled to or integrated with a sidewall of the inlet door.

Referring to FIG. 6, the inlet door 402 has a lid 404 with an interior side 406, a first sidewall 408 with an interior side 410, and a second sidewall 412 with an interior side (which is hidden from view in FIG. 6). The first and second sidewalls 408, 412 cooperate with the lid 404 to form a scoop for the incoming air. In accordance with the illustrated embodiment, a first acoustic reflector 414 is mounted to or integrated with the interior side 406 of the lid 404, and a second acoustic reflector 416 is mounted to or integrated with the interior side 410 of the first sidewall 408. Another acoustic reflector may be utilized with the second sidewall 412 (not shown or described here). The acoustic reflectors 414, 416 may be generally configured as described above with reference to the acoustic reflector 304 (see FIG. 5). In contrast to the arrangement and orientation of the acoustic reflector 304, the first acoustic reflector 414 shown in FIG. 6 is angled to the side. In other words, the right side of the acoustic reflector 414 is offset from the interior side 406 of the lid 404 by a greater amount than the left side of the acoustic reflector 414. In accordance with the depicted embodiment, the second acoustic reflector 416 is also wedge-shaped, with its leading (convex) edge offset from the interior side 410 of the first sidewall 408 by a greater amount than its trailing edge.

As explained in more detail below with reference to FIG. 9 and FIG. 10, the shape, size, dimensions, surface texture (if any), arrangement and position on the interior sides 406, 410, and/or geometry (e.g., reflective angle or angles) of the acoustic reflectors 414, 416 can be specifically designed, engineered, and configured as needed to achieve the desired noise reduction at or near the passenger loading zone. In this regard, simulation data from acoustic ray tracing techniques and/or measured sound test data can be collected and analyzed to determine an effective, efficient, or optimized design and configuration for the acoustic reflectors 414, 416.

Figure 7:
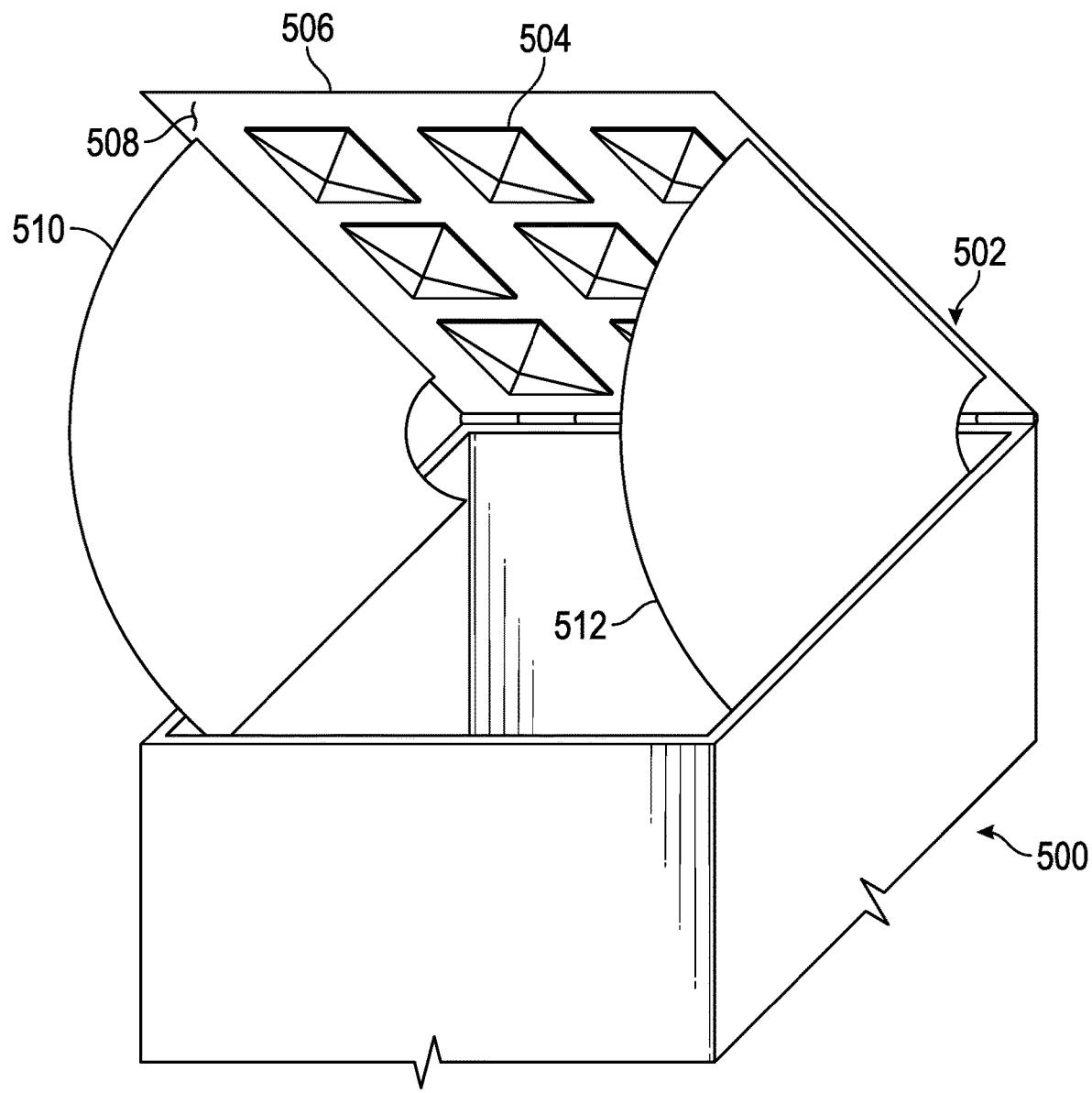
FIG. 7 is a perspective view that schematically depicts a portion of an APU inlet assembly with an embodiment of an inlet door that includes or cooperates with a means for redirecting sound waves implemented as a plurality of acoustic diffusing elements coupled to or integrated with the lid of the inlet door.

In accordance with some embodiments, the means for redirecting sound waves includes or cooperates with at least one acoustic diffuser that scatters or diffuses the sound waves to reduce corresponding noise levels in or near the passenger loading zone. In this regard, FIG. 7 is a perspective view that schematically depicts a portion of an APU inlet assembly 500 with an embodiment of an inlet door 502 that includes or cooperates with a means for redirecting sound waves implemented as a plurality of acoustic diffusing elements 504 coupled to or integrated with the lid 506 of the inlet door 502. In accordance with the illustrated embodiment, the acoustic diffusing elements 504 are mounted to or integrated with the interior side 508 of the lid 506. Although not shown in FIG. 7, one or more identical or similar acoustic diffusing elements 504 can be incorporated into or coupled to one or both sidewalls 510, 512. The acoustic diffusing elements 504 are shaped, sized, and arranged to scatter the sound waves generated by the APU. The non-limiting embodiment shown in FIG. 7 employs acoustic diffusing elements 504 that resemble pyramids that extend from the interior side 508 of the lid 506. The particular shape, size, layout, number, and arrangement of acoustic diffusing elements 504 may vary from one embodiment of the inlet door 502 to another. Moreover, the acoustic diffusing elements 504 need not be the same shape or size.

The acoustic diffusing elements 504 disperse and diffuse the sound waves emitted by the inlet duct such that the level of noise heard at or near the passenger loading zone is reduced. To this end, some of the acoustic energy that reaches the acoustic diffusing elements 504 is redirected in multiple directions away from the inlet door 502, rather than being directed in any focused manner toward the passenger loading zone or the main entry door of the aircraft. As explained in more detail below with reference to FIG. 9 and FIG. 10, the shape, size, dimensions, surface texture (if any), arrangement and position on the interior side 508, and/or geometry of the acoustic diffusing elements 504 can be specifically designed, engineered, and configured as needed to achieve the desired noise reduction at or near the passenger loading zone. In this regard, simulation data from acoustic ray tracing techniques and/or measured sound test data can be collected and analyzed to determine an effective, efficient, or optimized design and configuration for the acoustic diffusing elements 504.

Figure 8:
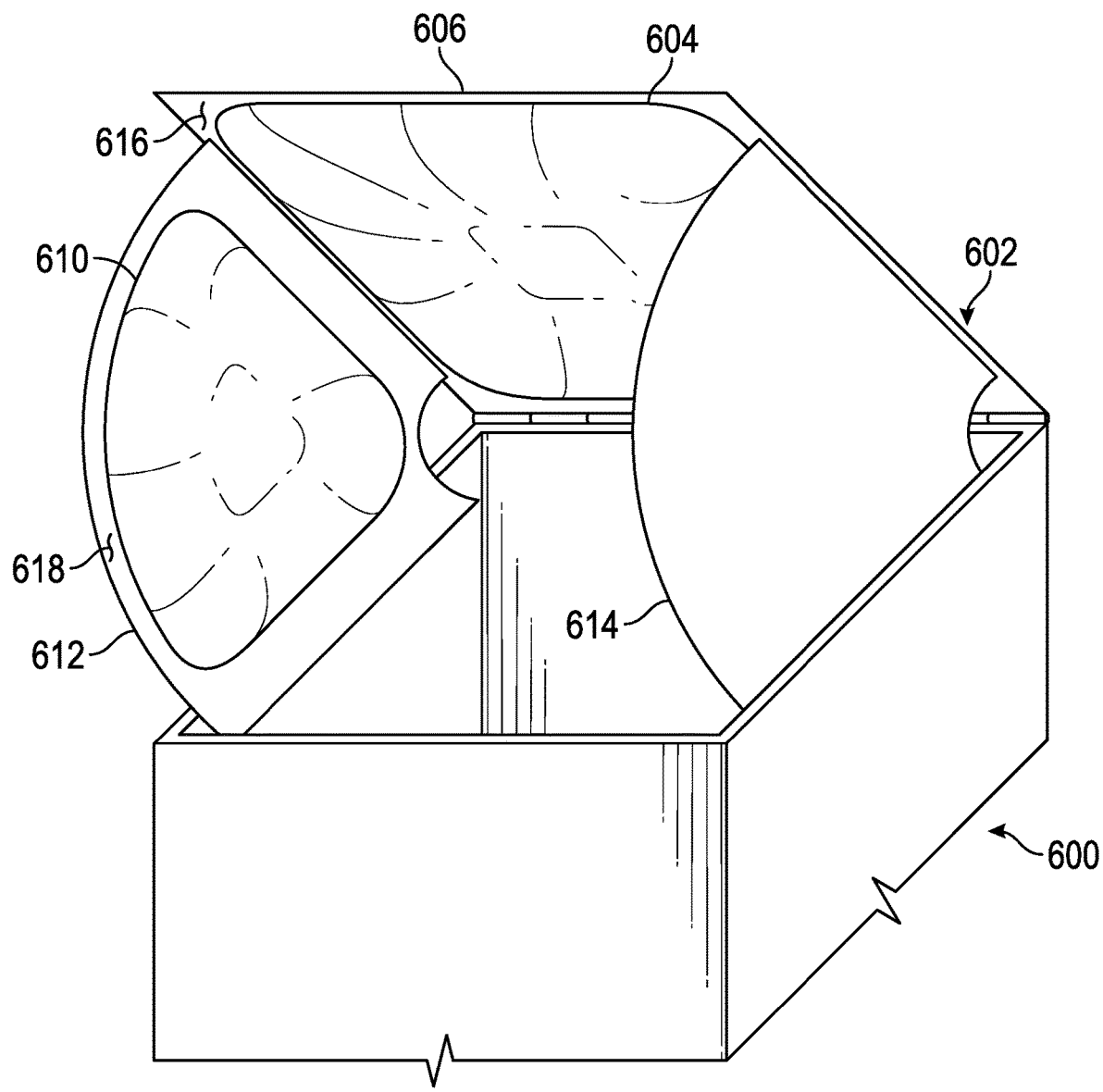
FIG. 8 is a perspective view that schematically depicts a portion of an APU inlet assembly with an embodiment of an inlet door that includes or cooperates with a means for redirecting sound waves implemented as a first acoustic diffuser coupled to or integrated with the lid of the inlet door and a second acoustic diffuser coupled to or integrated with a sidewall of the inlet door.

FIG. 8 is a perspective view that schematically depicts a portion of an APU inlet assembly 600 with an embodiment of an inlet door 602 that includes or cooperates with a means for redirecting sound waves implemented two physically distinct acoustic diffusers. A first acoustic diffuser 604 is coupled to or integrated with the lid 606 of the inlet door 608. A second acoustic diffuser 610 is coupled to or integrated with a sidewall 612 of the inlet door 608. Although not depicted in FIG. 8, at least one additional acoustic diffuser may be deployed on the other sidewall 614 of the inlet door.

In accordance with the illustrated embodiment, the acoustic diffuser 604 is mounted to or integrated with the interior side 616 of the lid 606, and the acoustic diffuser 610 is mounted to or integrated with the interior side 618 of the sidewall 612. The acoustic diffusers 604, 610 are shaped, sized, and arranged to scatter the sound waves generated by the APU. For example, an acoustic diffuser 604, 610 can include at least one contoured diffusing surface to scatter the sound waves generated by the APU. The non-limiting embodiment shown in FIG. 8 employs acoustic diffusers 604, 610 having smooth and convex outer surfaces. The outer surfaces may be substantially continuous and without sharp corners or edges. The particular shape, size, layout, number, and arrangement of convex acoustic diffusers 604, 610 may vary from one embodiment of the inlet door 602 to another. Moreover, the acoustic diffusers 604, 610 need not be the same shape or size.

As explained in more detail below with reference to FIG. 9 and FIG. 10, the shape, size, dimensions, surface texture (if any), arrangement and position on the interior sides 616, 618, and/or geometry of the acoustic diffusers 604, 610 can be specifically designed, engineered, and configured as needed to achieve the desired noise reduction at or near the passenger loading zone. In this regard, simulation data from acoustic ray tracing techniques and/or measured sound test data can be collected and analyzed to determine an effective, efficient, or optimized design and configuration for the acoustic diffusers 604, 610.

An inlet door that incorporates a means for redirecting sound waves (to reduce APU noise levels at or near the passenger loading zone) can be designed, engineered, and configured in a particular manner that contemplates and considers the specifications of the host aircraft. To this end, the particular location (on the APU inlet door) of the means for redirecting sound waves and/or the specified or chosen acoustic features and characteristics of the means for redirecting sound waves can be determined by, dictated by, or influenced by various dimensions, structures, and/or layout of aircraft components and features. For example, the particular location of the means for redirecting sound waves, acoustic features of the means for redirecting sound waves, and/or acoustic properties of the means for redirecting sound waves can be determined by any or all of the following, without limitation: physical dimensions of the aircraft (e.g., dimensions of the fuselage, such as length, width, height); physical dimensions of the APU inlet door; the location of the main entry door of the aircraft relative to the location of the APU inlet door; the distance between the main entry door and the APU inlet door; the orientation of the APU inlet door when the APU inlet door is in the open position; the opening angle of the APU inlet door; and the height of the APU inlet door relative to the ground when the aircraft is grounded.

Figure 9:
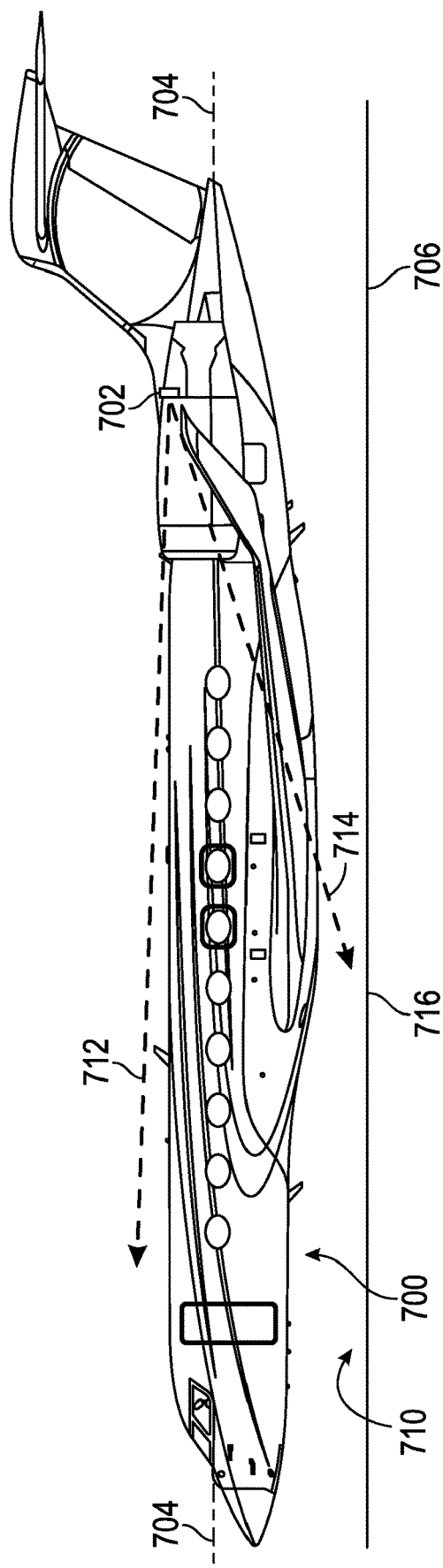
FIG. 9 is a side view of an aircraft that includes schematic representations of sound waves redirected by an APU inlet door configured in accordance with certain embodiments of the invention.

FIG. 9 is a side view of an aircraft 700 that includes schematic representations of sound waves redirected by an APU inlet door 702 that is configured in accordance with certain embodiments of the invention. The aircraft 700 has a central longitudinal axis 704, which is parallel with a plane that corresponds to the ground 706. The longitudinal axis 704 is generally aligned with the major longitudinal span of the aircraft 700, and it may be centered relative to the space defined by the fuselage. As described above, the inlet door 702 may include an acoustic reflector (not separately shown in FIG. 9) that reflects sound waves generated by the APU. In accordance with some embodiments, the acoustic reflector is designed, configured, and positioned in a suitable manner such that it reflects sound waves at one or more specified or offset angles, relative to the central longitudinal axis 704 and directed above a passenger loading zone 710. The dashed arrow 712 in FIG. 9 schematically represents a reflected path of sound waves that is redirected to a point well above the passenger loading zone 710. Reflection of sound waves away from the passenger loading zone 710 in this manner results in a reduction of noise experienced at or near the passenger loading zone 710. Alternatively or additionally, the acoustic reflector can be designed, configured, and positioned in a suitable manner such that it reflects sound waves at one or more specified or offset angles, relative to the central longitudinal axis 704 and directed below the passenger loading zone 710. In this regard, the dashed arrow 714 in FIG. 9 schematically represents a reflected path of sound waves that is redirected toward a ground location 716 that is outside of the passenger loading zone 710. Reflection of sound waves away from the passenger loading zone 710 in this manner results in a reduction of noise experienced at or near the passenger loading zone 710.

Figure 10:
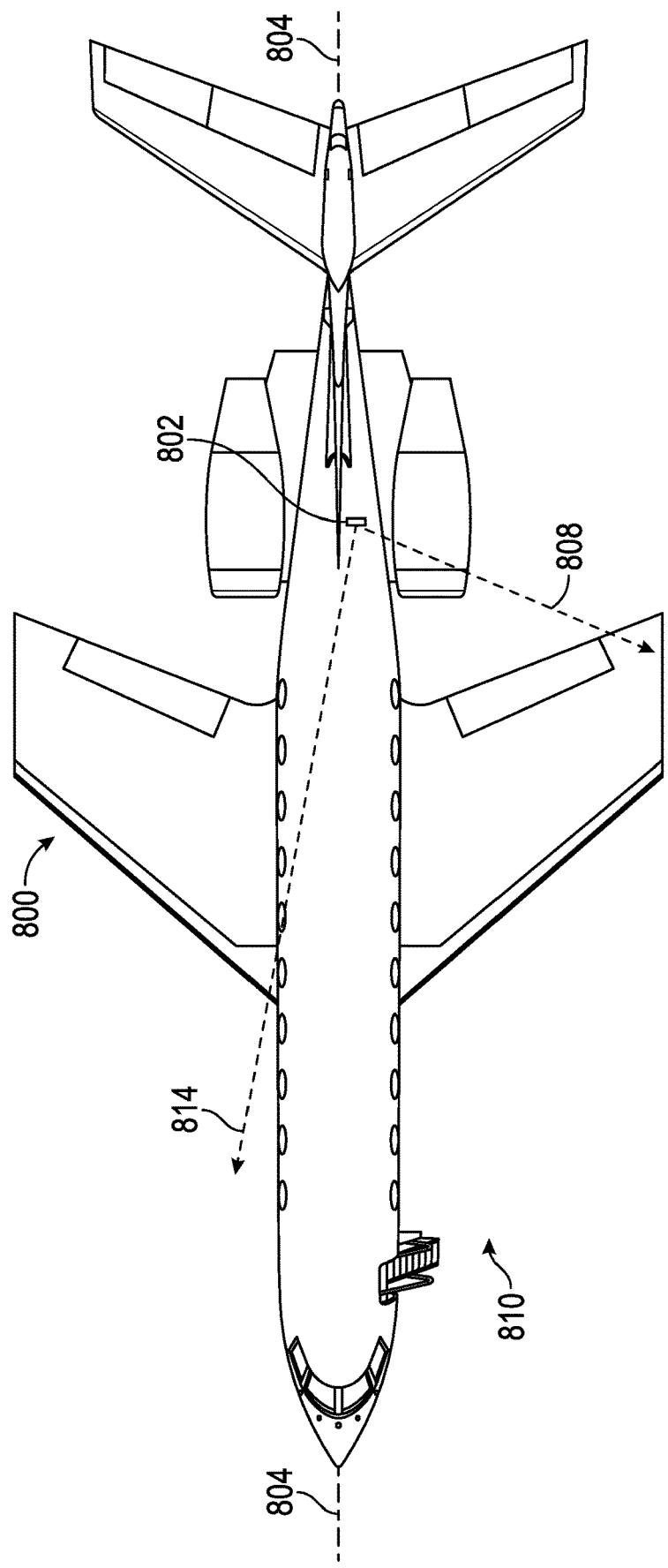
FIG. 10 is a top view of an aircraft that includes schematic representations of sound waves redirected by an APU inlet door configured in accordance with certain embodiments of the invention.

FIG. 10 is a top view of an aircraft 800 that includes schematic representations of sound waves redirected by an APU inlet door 802 that is configured in accordance with certain embodiments of the invention. The aircraft 800 has a central longitudinal axis 804, which is parallel with a plane that corresponds to the ground. The longitudinal axis 804 is generally aligned with the major longitudinal span of the aircraft 800, and it may be centered relative to the space defined by the fuselage. As described above, the inlet door 802 may include an acoustic reflector (not separately shown in FIG. 10) that reflects sound waves generated by the APU. In accordance with some embodiments, the acoustic reflector is designed, configured, and positioned in a suitable manner such that it reflects sound waves at one or more specified or offset angles, relative to the central longitudinal axis 804 and directed toward the port side of the aircraft 800 and/or toward the starboard side of the aircraft 800. The dashed arrow 808 in FIG. 10 schematically represents a reflected path of sound waves that is redirected toward the port side of the aircraft 800 at an angle directed outside of the passenger loading zone 810. Reflection of sound waves away from the passenger loading zone 810 in this manner results in a reduction of APU noise experienced at or near the passenger loading zone 810. Alternatively or additionally, the acoustic reflector can be designed, configured, and positioned in a suitable manner such that it reflects sound waves at one or more specified or offset angles, relative to the central longitudinal axis 804 and directed toward the starboard side of the aircraft 800. The dashed arrow 814 in FIG. 10 schematically represents a reflected path of sound waves that is redirected toward the starboard side of the aircraft 800 at an angle directed outside of the passenger loading zone 810. Reflection of sound waves away from the passenger loading zone 810 in this manner results in a reduction of APU noise experienced at or near the passenger loading zone 810.

FIG. 9 and FIG. 10 illustrate several redirected angles and directions for sound waves generated by the APU onboard an aircraft. An implementation that utilizes an acoustic diffuser can redirect the incident sound waves in many different directions and at many different angles. In practice, the means for redirecting sound waves (that resides at the APU inlet door) can be suitably configured to reflect, disperse, and/or diffuse the sound waves in multiple directions that divert the sound waves away from the passenger loading zone. The manner in which the APU inlet door refocuses or diffuses the sound waves to reduce the level of APU noise at or near the passenger loading zone may vary from one embodiment to another, depending on the particular configuration, arrangement, positioning, and composition of the means for redirecting sound waves.

An APU inlet door of the type described here can be fabricated, assembled, and installed in various ways to suit the needs of the particular host aircraft. Accordingly, the inlet door can be manufactured as a unitary component having the means for redirecting sound waves (e.g., reflecting and/or diffusing elements, surfaces, or features) integrally formed with other structure of the inlet door. Alternatively, the inlet door can be realized as an assembly of different parts, including a suitably configured fairing, accessory, skin, sheet, or layer, that performs the reflecting and/or diffusing of the sound waves. Moreover, legacy APU inlet doors (which may be new stock or already installed on older aircraft) can be retrofitted by adding a compatible and appropriately configured means for redirecting sound waves.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An auxiliary power unit (APU) inlet assembly for use with an APU on an aircraft having a main entry door, wherein a passenger loading zone is associated with the main entry door, the APU inlet assembly comprising:
   an inlet duct having a first end and a second end, wherein the first end is couplable to the APU;
   an inlet door associated with the second end of the inlet duct, the inlet door comprising an exterior side and an interior side, the inlet door configured to move between a first position and a second position, the inlet door closing the second end of the inlet duct when the inlet door is in the first position, and the inlet door permitting air to enter the second end of the inlet duct when the inlet door is in the second position; and
   means for redirecting sound waves coupled to or integrated with the interior side of the inlet door, the means for redirecting sound waves positioned at a particular location on the interior side of the inlet door, and the means for redirecting sound waves comprising acoustic features and characteristics, wherein the particular location and the acoustic features and characteristics cooperate to redirect sound waves generated by the APU away from the passenger loading zone when the inlet door is in the second position;
   wherein the means for redirecting sound waves comprises an acoustic reflector that reflects sound waves generated by the APU away from the passenger loading zone when the inlet door is in the second position.

2. The APU inlet assembly of claim 1, wherein:
   the aircraft has a central longitudinal axis; and
   the acoustic reflector reflects sound waves generated by the APU at an offset angle, relative to the central longitudinal axis and directed toward a port side of the aircraft, to redirect the sound waves generated by the APU away from the passenger loading zone.

3. The APU inlet assembly of claim 1, wherein:
   the aircraft has a central longitudinal axis; and
   the acoustic reflector reflects sound waves generated by the APU at an offset angle, relative to the central longitudinal axis and directed toward a starboard side of the aircraft, to redirect the sound waves generated by the APU away from the passenger loading zone.

4. The APU inlet assembly of claim 1, wherein:
   the aircraft has a central longitudinal axis; and
   the acoustic reflector reflects sound waves generated by the APU at an offset angle, relative to the central longitudinal axis and directed above the passenger loading zone, to redirect the sound waves generated by the APU away from the passenger loading zone.

5. The APU inlet assembly of claim 1, wherein:
   the aircraft has a central longitudinal axis; and
   the acoustic reflector reflects sound waves generated by the APU at an offset angle, relative to the central longitudinal axis and directed toward a ground location outside of the passenger loading zone, to redirect the sound waves generated by the APU away from the passenger loading zone.

6. An auxiliary power unit (APU) inlet assembly for use with an APU on an aircraft having a main entry door, wherein a passenger loading zone is associated with the main entry door, the APU inlet assembly comprising:
   an inlet duct having a first end and a second end, wherein the first end is couplable to the APU;
   an inlet door associated with the second end of the inlet duct, the inlet door comprising an exterior side and an interior side, the inlet door configured to move between a first position and a second position, the inlet door closing the second end of the inlet duct when the inlet door is in the first position, and the inlet door permitting air to enter the second end of the inlet duct when the inlet door is in the second position; and
   means for redirecting sound waves coupled to or integrated with the interior side of the inlet door, the means for redirecting sound waves positioned at a particular location on the interior side of the inlet door, and the means for redirecting sound waves comprising acoustic features and characteristics, wherein the particular location and the acoustic features and characteristics cooperate to redirect sound waves generated by the APU away from the passenger loading zone when the inlet door is in the second position;
   wherein the means for redirecting sound waves comprises an acoustic diffuser that scatters sound waves generated by the APU, to reduce corresponding noise level in the passenger loading zone when the inlet door is in the second position.

7. The APU inlet assembly of claim 6, wherein the acoustic diffuser comprises at least one contoured diffusing surface to scatter the sound waves generated by the APU.

8. The APU inlet assembly of claim 6, wherein the acoustic diffuser comprises a plurality of physically distinct diffusing elements that cooperate to scatter the sound waves generated by the APU.

9. The APU inlet assembly of claim 1, wherein the particular location of the means for redirecting sound waves is determined by physical dimensions of the aircraft, physical dimensions of the inlet door, location of the main entry door relative to location of the inlet door, and orientation of the inlet door when the inlet door is in the second position.

10. The APU inlet assembly of claim 1, wherein the acoustic features and characteristics of the means for redirecting sound waves are determined by physical dimensions of the aircraft, physical dimensions of the inlet door, location of the main entry door relative to location of the inlet door, and orientation of the inlet door when the inlet door is in the second position.

11. An inlet door for an auxiliary power unit (APU) of an aircraft having a main entry door, wherein a passenger loading zone is associated with the main entry door, the inlet door comprising:
an exterior side;
an interior side; and
means for redirecting sound waves coupled to or integrated with the interior side, the means for redirecting sound waves positioned at a particular location on the interior side, and the means for redirecting sound waves comprising acoustic features and characteristics, wherein the particular location and the acoustic features and characteristics cooperate to redirect sound waves generated by the APU away from the passenger loading zone when the inlet door is in an open position; wherein
the means for redirecting sound waves comprises an acoustic reflector that reflects sound waves generated by the APU away from the passenger loading zone when the inlet door is in the open position.

12. An inlet door for an auxiliary power unit (APU) of an aircraft having a main entry door, wherein a passenger loading zone is associated with the main entry door, the inlet door comprising:
an exterior side;
an interior side; and
means for redirecting sound waves coupled to or integrated with the interior side, the means for redirecting sound waves positioned at a particular location on the interior side, and the means for redirecting sound waves comprising acoustic features and characteristics, wherein the particular location and the acoustic features and characteristics cooperate to redirect sound waves generated by the APU away from the passenger loading zone when the inlet door is in an open position;
wherein the means for redirecting sound waves comprises an acoustic diffuser that scatters sound waves generated by the APU, to reduce corresponding noise level in the passenger loading zone when the inlet door is in the open position.

13. The inlet door of claim 11, wherein the particular location of the means for redirecting sound waves is determined by physical dimensions of the aircraft, physical dimensions of the inlet door, location of the main entry door relative to location of the inlet door, and orientation of the inlet door when the inlet door is in the open position.

14. The inlet door of claim 11, wherein the acoustic features and characteristics of the means for redirecting sound waves are determined by physical dimensions of the aircraft, physical dimensions of the inlet door, location of the main entry door relative to location of the inlet door, and orientation of the inlet door when the inlet door is in the open position.

15. An aircraft comprising:
a fuselage;
a main entry door coupled to the fuselage, wherein a passenger loading zone is associated with the main entry door;
an auxiliary power unit (APU) located inside the fuselage; and
an APU inlet assembly comprising:
an inlet duct having a first end and a second end, wherein the first end is coupled to the APU;
an inlet door associated with the second end of the inlet duct, the inlet door comprising an exterior side and an interior side, the inlet door configured to move between a closed position and an open position, the inlet door closing the second end of the inlet duct when the inlet door is in the closed position, and the inlet door permitting air to enter the second end of the inlet duct when the inlet door is in the open position; and
means for redirecting sound waves coupled to or integrated with the interior side of the inlet door, the means for redirecting sound waves positioned at a particular location on the interior side of the inlet door, and the means for redirecting sound waves comprising acoustic features and characteristics, wherein the particular location and the acoustic features and characteristics cooperate to redirect sound waves generated by the APU away from the passenger loading zone when the inlet door is in the open position;
wherein the means for redirecting sound waves comprises an acoustic reflector that reflects sound waves generated by the APU away from the passenger loading zone when the inlet door is in the open position.

16. The aircraft of claim 15, wherein acoustic properties of the means for redirecting sound waves are dictated by physical dimensions of the fuselage, physical dimensions of the inlet door, distance between the main entry door and the inlet door, orientation of the inlet door when the inlet door is in the open position, and height of the inlet door relative to ground when the aircraft is grounded.

17. An aircraft comprising:
a fuselage;
a main entry door coupled to the fuselage, wherein a passenger loading zone is associated with the main entry door;
an auxiliary power unit (APU) located inside the fuselage; and
an APU inlet assembly comprising:
an inlet duct having a first end and a second end, wherein the first end is coupled to the APU;
an inlet door associated with the second end of the inlet duct, the inlet door comprising an exterior side and an interior side, the inlet door configured to move between a closed position and an open position, the inlet door closing the second end of the inlet duct when the inlet door is in the closed position, and the inlet door permitting air to enter the second end of the inlet duct when the inlet door is in the open position; and
means for redirecting sound waves coupled to or integrated with the interior side of the inlet door, the means for redirecting sound waves positioned at a particular location on the interior side of the inlet door, and the means for redirecting sound waves comprising acoustic features and characteristics, wherein the particular location and the acoustic features and characteristics cooperate to redirect sound waves generated by the APU away from the passenger loading zone when the inlet door is in the open position;

wherein the means for redirecting sound waves comprises an acoustic diffuser that scatters sound waves generated by the APU, to reduce corresponding noise level in the passenger loading zone when the inlet door is in the open position.

* * * * *